UNITED STATES PATENT OFFICE.

ALEXANDER K. MURRAY, OF BRADFORD, PENNSYLVANIA.

FUEL-BLOCK.

SPECIFICATION forming part of Letters Patent No. 419,866, dated January 21, 1890.

Application filed March 20, 1889. Serial No. 304,023. (No model.)

*To all whom it may concern:*

Be it known that I, ALEXANDER K. MURRAY, a citizen of the United States, residing at Bradford, in the county of McKean and State of Pennsylvania, have invented certain new and useful Improvements in Fuel-Blocks; and I do declare the following to be a full, clear, and exact description of the invention, such as will enable others skilled in the art to which it appertains to make and use the same.

My invention has relation to fuel-blocks such as are used as a body to contain oil to be burned, the object being to furnish to housekeepers and others a solid block sufficiently porous to contain a quantity of oil, but at the same time not so porous as to allow the oil to escape from the interior too rapidly, it being of course necessary that the block shall be non-combustible and of such structure that the pores shall not be liable to clog up easily, and thus render the block comparatively useless. With such objects in view I have devised the block hereinafter described, the particular points of novelty in which are specifically pointed out in the subjoined claim.

In carrying out my invention I take a mold of the same size, and it may be the same mold in which my block is afterward to be pressed or compacted, and fill it with dry sawdust slightly packed. This I pour into a suitable receptacle of a larger size. I now make a mixture consisting of a suitable quantity of clay (blue clay preferred) and water to bring it to such a consistency as will, when mixed with the sawdust, cause the particles thereof to adhere together and form a pliable mass of about the consistency of stiff putty. This mixture I thoroughly incorporate with the sawdust by careful stirring by any suitable means. I now take some hardening or binding material—such as plaster-of-paris, quicklime, water-lime, &c., plaster-of-paris being preferred—and mix with water to a proper consistency to cause it to properly mix with the mass of sawdust, clay, and water, before described. This mixture is then incorporated with the previously-formed mass by any suitable mixing means, after which the whole mass is placed in the first-named mold and pressed and allowed to thoroughly dry and harden. The result will be a very efficient, durable, and cheap block, possessing all the desired qualities, as hereinbefore detailed. When saturated with oil, the oil will be gradually given off, so that it will burn with a clear white blaze for about an hour, the escape of oil being such, due to the properties of the block, that no more will be be let off at any time than will be entirely consumed, there being no perceptible smoke or soot given off.

Having now described my invention, what I believe to be new and desire to secure by Letters Patent, and what I therefore claim, is—

A fuel-block composed, essentially, of sawdust, a binder of clay and water, and a hardening mixture of plaster-of-paris and water, in substantially the proportions specified.

In testimony whereof I affix my signature in presence of two witnesses.

ALEXANDER K. MURRAY.

Witnesses:
    GEO. A. BERRY,
    T. J. MELVIN.